(12) United States Patent
Fabien et al.

(10) Patent No.: US 7,471,961 B2
(45) Date of Patent: Dec. 30, 2008

(54) GROUP CALL SERVICE USING BROADCAST RADIO BEARER

(75) Inventors: Jean-Aicard Fabien, Lincolnshire, IL (US); Rapeepat Ratasuk, Hoffman Estates, IL (US); Stephen L. Spear, Skokie, IL (US); Nick W. Whinnett, Marlborough (GB); Zhijun Cai, Euless, TX (US); Mansoor Ahmed, Hurst, TX (US); Robert M. Harrison, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 287 days.

(21) Appl. No.: 11/531,725

(22) Filed: Sep. 14, 2006

(65) Prior Publication Data

US 2007/0082690 A1 Apr. 12, 2007

Related U.S. Application Data

(60) Provisional application No. 60/721,689, filed on Sep. 29, 2005.

(51) Int. Cl.
*H04Q 7/20* (2006.01)
*H04B 7/00* (2006.01)
*H04M 1/00* (2006.01)

(52) U.S. Cl. .......................... 455/519; 455/445; 455/458

(58) Field of Classification Search .................. 455/517, 455/518, 519, 521, 416, 436, 439, 522, 67.11
See application file for complete search history.

(56) References Cited

U.S. PATENT DOCUMENTS

| | | | |
|---|---|---|---|
| 5,881,368 A | 3/1999 | Grob et al. | |
| 6,115,613 A * | 9/2000 | Jonsson | 455/519 |
| 6,119,007 A * | 9/2000 | Chater-Lea | 455/442 |
| 6,178,166 B1 | 1/2001 | Wilson et al. | |
| 6,333,921 B1 * | 12/2001 | Grube et al. | 370/312 |
| 7,010,315 B1 * | 3/2006 | Pan et al. | 455/519 |
| 7,054,660 B2 * | 5/2006 | Lord | 455/558 |
| 2004/0053619 A1 | 3/2004 | Kim et al. | |
| 2004/0097239 A1 | 5/2004 | Kim | |
| 2004/0137885 A1 | 7/2004 | Sarkkinen et al. | |
| 2005/0141471 A1 * | 6/2005 | Virtanen et al. | 370/342 |
| 2007/0232308 A1 * | 10/2007 | Bergstrom et al. | 455/436 |

OTHER PUBLICATIONS

3GPP TS 25.346 v6.5.0(Jun. 2004), 3rd Generation Partnership Project; Technical Specification Group Radio Access Network; Introduction of the Multimedia Broadcast Multicast Service (MBMS) in the Radio Access Network (RAN; Stage 2 (Release 6), pp. 1-60.

* cited by examiner

*Primary Examiner*—Tilahun B Gesesse
(74) *Attorney, Agent, or Firm*—Brian M. Mancini (57) ABSTRACT

A system and method for to establish a wireless group call from one of a plurality of communication units to others communication units includes a first step of receiving, from a requesting communication unit a request for a group call with other communication units of the group. A next step includes allocating a common downlink channel for the group call. A next step includes allocating a dedicated uplink channel for the requesting communication unit. A next step includes switching one of the communication units between the common channel mode and a dedicated channel mode depending upon performance criteria.

22 Claims, 5 Drawing Sheets

GROUP CALL SERVICE USING BROADCAST RADIO BEARER

FIELD OF THE INVENTION

The present invention relates generally to the field of wireless communications and, more particularly, to group call service in a communication system.

BACKGROUND OF THE INVENTION

Group services such as Push-To-Talk (PTT) services, wherein one device can communicate simultaneously with other designated communication devices in a group, have been in use for years, such as in two-way trunked-radio dispatch systems for example. A typical dispatch two-way radio communication system comprises communication units, communication resources, communication sites, and a communication resource allocator. Each of the sites has a substantially distinct coverage area and is geographically located throughout the system. Each site also has a number of communication resources assigned to it, where at least one of the communication resources is used as a control channel, while a number of the remaining communication resources are used as voice channels. Such systems are known to use frequency division multiple access (FDMA) and time division multiple access (TDMA) methods to rebroadcast transmissions, for example.

In a system that supports dispatch group calls, the communication units are typically arranged into communication groups (talkgroups) and may be located anywhere within the system (in any site). When a communication unit of a talkgroup requests a group call, it transmits, via a control channel of the site in which it is located, an inbound signaling message to the communication resource allocator. (A group call typically allows all members of the same talkgroup that are located within the system to communicate with each other.) The inbound signaling message generally comprises the requesting communication unit's individual identification number, the requesting communication unit's talkgroup, and a request for a group call. Upon receiving the inbound signaling message, the communication resource allocator will allocate a dedicated voice channel in any necessary sites to the requesting communication unit's talkgroup.

Thus, in dispatch systems a dedicated forward link is established (one in each site where communication units are present) and monitored by all units involved in the group call in that site, and a single reverse link which is used by the group member who is currently transmitting to the other members. Non-transmitting talk group members are typically in a listen only mode (i.e., not able to transmit when another member is talking) and thus are not allocated a dedicated reverse link.

More recently, in response to an ever-accelerating worldwide demand for mobile and personal portable communications, code division multiple access (CDMA) have proven to be a popular system for serving large populations of multiple access users over analog or other digital technologies, such as for the Third Generation Partnership Project (3GPP) for example. CDMA is well suited for cellular communications, but is only know being employed in a system supporting group services, such as PTT. However, implementing PTT service in different types of communication networks, such as CDMA, have inherent problems that must be solved if groups services are to enjoy widespread and efficient use.

Currently, group services such as PTT and Push-to-Video, or more generally Push-to-Something (PTx) services are provided by a network in multiple cells based on the IP protocol stack. However, two disadvantages have been observed: a) a larger setup delay is introduced, which is intolerable for Push service, and b) there is as inefficient utilization of the air interface. Group service is characterized by one-to-one or one-to-many communication. For PTT services over WCDMA as currently implemented each communication device or user equipment (UE) participating in a group session is in dedicated channel (Cell_DCH) state. Each UE in addition to the "talker" is receiving data from the single source on a dedicated channel, and is transmitting dedicated control channel in the uplink for synchronization and inner loop power control. In cells where there are many UEs participating in the same group session, the remaining throughput of the cell is reduced considerably due to the radio resources (code and power) assigned to multiple copies of the data from the single source on the downlink and also due to the associated uplink dedicated control channels.

A Multimedia Broadcast Multicast Service (MBMS) has been introduced to broadcast information simultaneously to multiple users. However, MBMS cannot be used for group call services in a one-to-many communication as is required for PTx services What is needed is a system and method to alleviate the aforementioned problems.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

The present invention provides a network and method to provide group call services using a broadcast radio bearer for a PTx system, and thereby alleviate the aforementioned drawbacks. In the description below, a PTT service is used an example. However, it should be recognized that the novel approach of applicants' invention can be extended for other PTx services.

The current mechanism for the PTT over cellular (PoC) service employs dedicated links amongst users for both the uplink and downlink, and in the control plane and traffic plane. This current technique simply allows for an arrangement wherein a higher layer sets up dedicated voice channels with some control over which user has the floor (talks). This is the most inefficient in terms of capacity as well as the delay (for dedicated resource setup). This technique is also considered the baseline mechanism against which the other mechanisms are measured.

The present invention provides a radio resource allocation technique that assigns one broadcast transport channel (based on an S-CCPCH physical channel) to communication devices or user equipment (UE) participating in a group session. As a result, the radio resources allocated (i.e. code and power) per group service are decreased and the overall cell throughput increases within a cell. The allocation of the broadcast transport channel instead of many dedicated (DCH) transport channels depends primarily on the number of UEs in a group session. Preferably, networks use additional or other criteria to switch between the use of one dedicated channel per UE and a broadcast channel for all UEs in the same cell.

Figure 1:
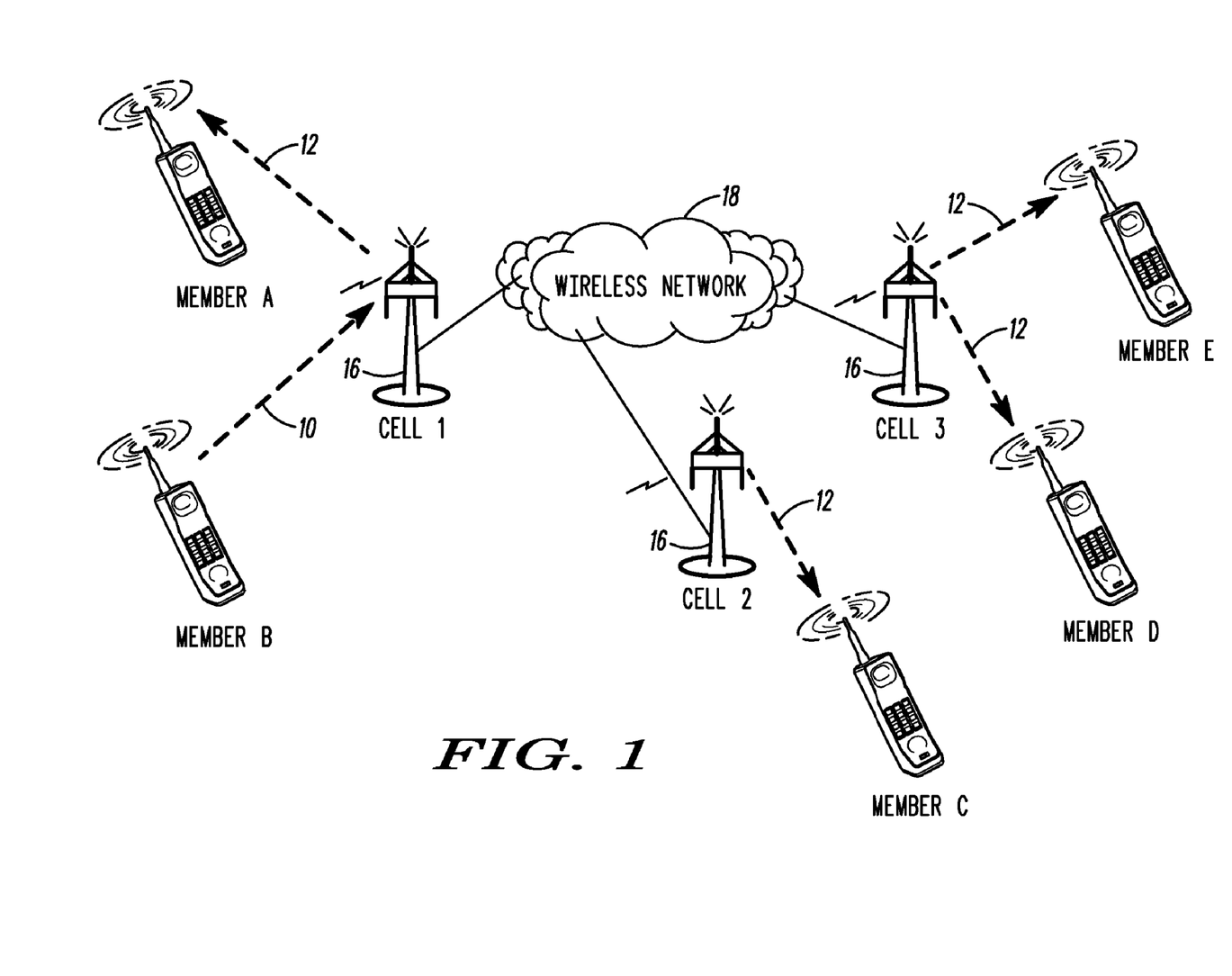
FIG. 1 shows a simplified diagram for a network, in accordance with the present invention.

Referring to FIG. 1, the present invention provides a method and network to establish group call services in a wireless 3GPP communication system, addressing the need for reliable PTx services and efficient use of radio resources. Specifically, FIG. 1 depicts a wireless CDMA communication system in accordance with a preferred embodiment of the present invention. The wireless communication system is a suitably modified CDMA system, such as a Wideband Spread Spectrum Digital Cellular System in accordance with, for example, the Telecommunications Industry Association/Electronic Industries Association Interim Standard 95 (EIA/TIA IS-95) as known in the art, and comprises a plurality of communication units (A through E) arranged into a call group in wireless communication with a wireless CDMA communication network. Each of the communication units is physically capable of duplex communications, although during typical group communications, only a single communication unit is transmitting at a time.

The fixed infrastructure of the wireless network 18 comprises those elements normally required to support communications within the wireless system and, in the preferred embodiment, conforms to a typical 3GPP or 3GPP2 architecture. The wireless network 18 comprises the Radio Access Network (RAN) and the switching Network. In particular, the wireless communication infrastructure comprises a 3GPP radio network controller (RNC) or 3GPP2 Base Station Controller (BSC) and associated base transceiver systems (BTSs) 16 servicing the group. RAN may include RNC or BSC and various gateways and servers. The RNC or BSC and BTS 16 and their operation are all well-known in the art and will not be dealt here for the purpose of simplicity. In practice, the RNC or BSC typically communicates with a switch, one or more other controllers, and additional infrastructure equipment not shown.

The communication infrastructure performs group call processing, which includes the method described herein. In the preferred embodiment, a controller, under the control of software algorithms stored in memory, performs the management of the group call processing. Preferably, the controller is the RNC or BSC of the serving base stations 16. However, the controller could also be incorporated into the base stations or can be provided separately such as in a PoC Server or Group & List Management Server (GLMS) for example. The BTSs 16 are also under the control of software algorithms stored in memory and manage the wireless air interface with the communication units A-E.

Each of the communication units includes a common set of elements. In particular, a processor, which typically comprises one or more processing devices (e.g., microprocessors, digital signal processors, etc.) and memory devices, is coupled to a transmitter and a receiver. Each of these elements is well-known in the art and will not be described herein. In the preferred embodiment, under the control of software algorithms stored in the memory devices of processor of each communication device, and in cooperation with the other elements shown, the processor performs those tasks required for operation of the communication unit.

In the example illustrated in FIG. 1, multisite operation is shown, i.e., where the communication units corresponding to the group are spread out among more than one site or cell. The 3GPP communication network includes a plurality of base transceiver systems (BTSs) 16, and each BTS, of the plurality of BTSs, provides wireless communication service to any communication unit, of a plurality of communication units, that is in the service coverage area of that BTS. In particular, the outbound traffic channel 12 and inbound traffic channel 10 are provided to the communication units via their associate BTS 16 using codes unique within that cell. Additionally, outbound traffic channels 12 are provided to the other communication units of the group via their associates BTS 16 using codes that are unique within their respective cells and, depending on various system parameters such as geographic site separation, possibly the same as the codes used by the originating BTS. Of course, it is possible that all communication units corresponding to a group could be located within a single site or cell, in which case a single BTS would be used to provide the group service.

Operation of the preferred 3GPP wireless communication network, in accordance with the present invention, occurs substantially as follows. A group identity is pre-defined for the members A-E of the group. Each member is programmed to respond to page or message for that group. In this way, a group page identity is established for the plurality of communication units of the group. At least one base transceiver system 16 services the group. The transceiver system 16 receives, from a requesting communication unit (Group Member B) of the group, a request 10 for a group call with other communication units (A, C, D, E) of a group. Upon receiving the group call request 10 from the communication unit (B), the BTSs 16 provide a single group paging message using the group page identity on a paging channel (PCH) to the group of the plurality of communication units with information for group call set up. The network also allocates a single voice channel 12 in each cell (Cell 1, 2, 3) that provides group call service to one or more communication units (Members A, C, D, E) of the group. In this way, the at least one base transceiver system can provide a group call from one of a plurality of communication units to others of the plurality of communication units that are in the service coverage area of the at least one base transceiver system.

A radio network controller controls the at least one base transceiver system servicing the group, wherein the controller is operable to: receive, from a requesting communication unit of a group, a request for a group call with other communication units of the group, allocate a common downlink channel for the group call at each base transceiver system of the at least one base transceiver systems that provides communication service to the others of the plurality of communication units of the group, allocate a dedicated uplink channel for the requesting communication unit by a base transceiver system that provides communication service to the requesting communication unit, and switch one of the communication units between a common channel mode and a dedicated channel mode depending upon performance criteria.

The present invention uses a Forward Access Channel (FACH) based solution, in conjunction with broadcast capabilities of MBMS, to provide PTT service. This solution is preferred because it outperforms the other solutions in both spectral efficiency and the setup delay. In its simplest embodiment, the present invention applies a FACH application in conjunction with a basic PTM (point-to-multipoint) application of MBMS. During a PoC session, all the users except the active user are in the CELL_FACH state. This significantly reduces resource usage on the uplink as well as the downlink. The active user employs a DTCH on the uplink which is in the CELL_DCH state. The downlink transmission for users receiving only is on a FACH for each cell.

In a preferred embodiment, the solution is enhanced with soft-combining of macro diversity branches. For example, the controller is operable to determine whether a communication unit (e.g. Member C) is in soft handoff mode between Cell 2 and Cell 3, wherein the controller directs that the same common channel is used by the base transceiver systems 16 of the adjacent cells for soft-combining of macro diversity branches for that communication unit.

Figure 2:
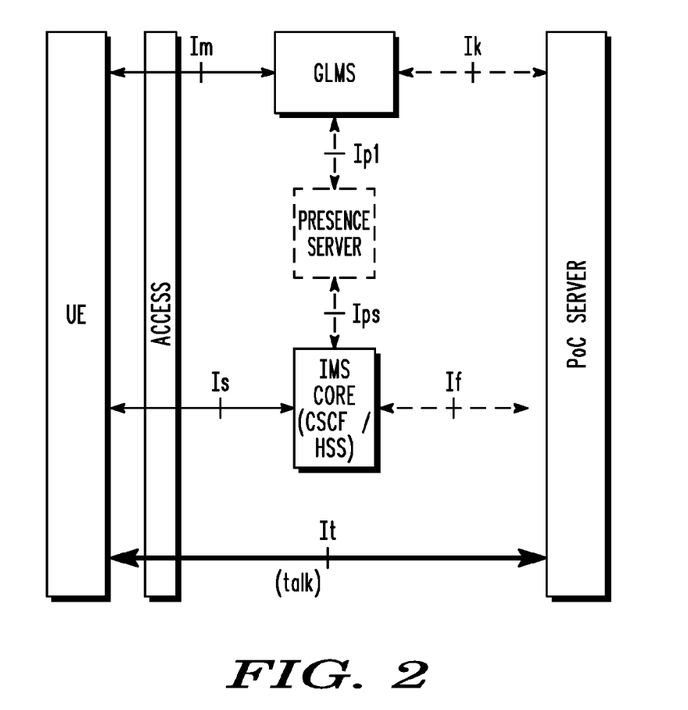
FIG. 2 shows a simplified block diagram of the network architecture of FIG. 1.

FIG. 2 depicts the network architecture that manages UEs in a call group of a localized PoC session. The present invention entails the limited use of dedicated circuit switched channels but is based in a packet switched domain. When all the UEs in a call group of a PoC session are localized in an area served by one or multiple controllers and associated BTSs, they are in a CELL_FACH state except the active UE for which the circuit switched links (DCCH) are set up in the control plane. The control function is completed in the CELL_FACH state during the group initialization. The PoC server maintains the group status as well as the floor control. The PoC server can be an independent entity or can be incorporated into any of the controllers or BTSs.

The controller is operable to determine whether there are a sufficient number of communication units for the group call to enable Forward Access Channel (FACH) mode whereupon the communication units for the group are placed in a CELL_FACH state, and wherein the serving base transceiver system is operable to receive the requesting communication unit transmitted initial data on a Random Access Channel (RACH). Specifically, the network determines whether there are sufficient UEs in the group session to enable CELL_FACH broadcast mode. The threshold for determining whether to employ broadcast mode is different depending on the bearer (e.g. Push to Talk: 12.2 kbps Voice service, Push to Video: 45 kbps, Push to Video and Voice: 64 kbps).

At the group initialization stage, a Group & List Management Server (GLMS) needs to send a message to notify one or multiple controllers (RNCs or BSCs) that this is a group call service. The group call context (such as group call status, group member ID, etc) should be established per group call in each controller. If the group member moves to a controller without the group call context, the group call context should be transferred to the new controller during the inter-RNC handover procedure. If the group is removed, the GLMS sends a message to the related controller to release the context and the radio resource. The GLMS needs to maintain a controller list per group call in which the group members reside. The list may be updated during the group call procedure. The group call context information allows the controller to set up the group call differently than a point-to-point call. On the traffic plane, the downlink data for the UEs are transmitted on a FACH. The uplink data of the active user are transmitted on a dedicated traffic channel (DTCH). The users that are not speaking will be in the CELL_FACH state. This setup allows one to enable PoC with minimal changes to the current 3GPP air interface.

Figure 3:
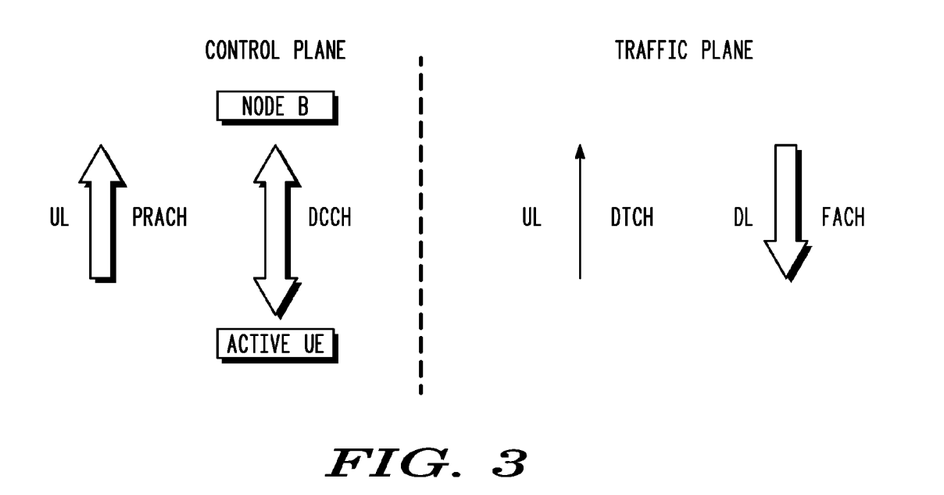
FIG. 3 shows a simplified channel structure diagram of operational communication modes of the network of FIG. 1.

The channel structure is illustrated in FIG. 3. A group call is initiated using the Physical Random Access Channel (PRACH) on the uplink. The controller then sets up the channels on the control plane. A Dedicated Control Channel (DCCH) is set up on the physical channel pair for the active UE in the control plane. The downlink traffic utilizes the CELL_FACH state for transmission.

The network will page UEs to set up the group call. If there are a large number of UEs in the group in Cellular Paging Channel (CELL_PCH), UTRAN Regional Area Paging Channel (URA_PCH), or idle mode, and a short discontinuous receive (DRX) cycle is used, multiple UEs could share a paging occasion, and therefore need to be served simultaneously on the Paging Channel (PCH). Since the PCH is typically configured with relatively small RLC sizes (240 bits), no more than a few UEs can be paged simultaneously on PCH. When a UE can't be served immediately, the network must delay an entire DRX cycle before retransmitting the page, and so the group setup will be delayed.

A solution to this problem is to use a group paging message on the Paging Control Channel (PCCH). The group paging message is a single message that may be used by any UE to set up the group call. Instead of identifying the UE, the message will identify the group call, allowing a single message to be used. Note that the UE will still monitor the same (UE specific) paging occasions and paging indicators as in Release 99 of 3GPP, so DRX operation is unaffected. Also note that the use of a group paging message slightly reduces PCH load, since now one message will be transmitted when UE paging occasions collide.

It should be noted that some group paging is already supported in 3GPP. However, this group paging serves only to release multiple UEs' Radio Resource Control (RRC) connections simultaneously, e.g. at RNC reset. The group identity is determined differently for group calls, since the existing group paging uses a masked version of the Radio Network Temporary Identifier (RNTI).

Figure 4:
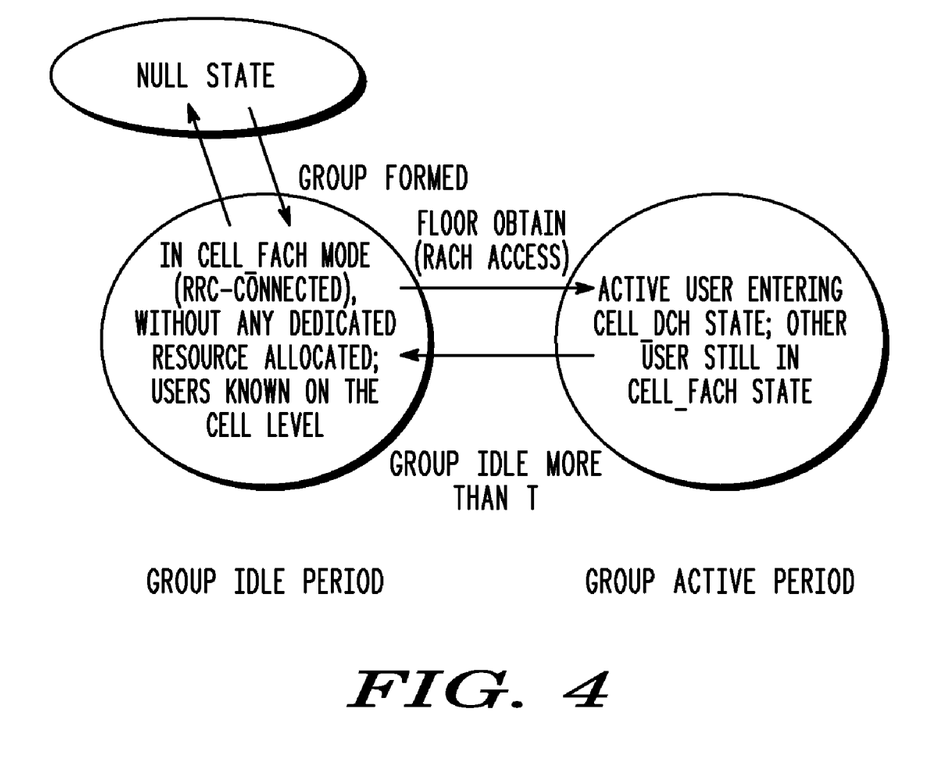
FIG. 4 shows a simplified group state diagram for the communication modes of the network of FIG. 1.

When the group is formed, all the UEs are in the CELL_FACH state without any dedicated resource allocated. When a member of the group pushes the "speak" button and obtains the floor, the user will enter the dedicated channel (CELL_DCH) state. That communication is then broadcast on an allocated common downlink channel, which is the Secondary Common Control Physical Channel (S-CCPCH) preferably. For each cell, if the number of users within the group exceeds a (configurable) threshold, the controller maintains the participants in the Group Call in CELL_FACH State. Here floor control and radio resource setup is based on the circuit switched function which is simple and quick (similar to current PTT delay; Uu interface delay should be only hundreds of milliseconds). After the user is finished speaking (and releases the "speak" button), the dedicated resource for that user will be released and the user will enter the CELL_FACH state again. The controller will monitor the session activity for each group; if a group's idle time exceeds a pre-defined timer expiration value (e.g. 120 seconds), the controller may release the traffic plane radio resource for this group (e.g., downlink FACH). Group state behavior is described in the FIG. 4.

Another novel aspect of the present invention is the switching of one of the communication units between a common channel mode and a dedicated channel mode depending upon performance criteria.

In one embodiment, the performance criteria is a number of communication units in the group, wherein if the number is greater than a predetermined number threshold then at least one of the plurality of communication units of the group are switched to a dedicated channel (CELL_DCH) state. If broadcast mode is enabled the broadcast may be made from one or more cells depending on set of cells that the UEs in the group are camped on.

In another embodiment, the performance criteria is a talk time on the common channel, wherein if the talk time is greater than a predetermined time threshold then that communication unit is switched to a dedicated channel (CELL_DCH) state. For example, when there is a new talker, the UE is in CELL_FACH state and transmits initial data on the RACH. The UE of a new talker may switch to CELL_DCH state depending on the transmission time.

In another embodiment, the performance criteria is a transmission traffic volume for the group, wherein if the transmission traffic volume is greater than a predetermined transmission traffic volume threshold then at least one of the plurality of communication units of the group are switched to a dedicated channel (CELL_DCH) state. For example, when there is a new talker, the UE is in CELL_FACH state and transmits initial data on the RACH. The UE of a new talker may switch to CELL_DCH state depending on the traffic volume.

In another embodiment, the performance criteria is a quality of signal on the common downlink channel to a communication unit in the group, wherein if the quality is less than a predetermined quality threshold then that communication unit is switched to a dedicated channel (CELL_DCH) state to receive the information. An individual listening UE will remain in CELL_FACH state to receive the broadcast transmission if it is being received with sufficient quality. This embodiment can also include switching to a CELL_DCH state predicated on that communication unit being in a soft handoff mode. This can be accomplished by selecting the predetermined quality threshold such that the common channel broadcast will provide a lower quality than the threshold at a location of a communication unit within a cell edge of the serving base transceiver system. In other words the quality threshold is selected such that broadcasts do not need to reach cell edge where it is more efficient to obtain macro-diversity benefit of the CELL_DCH state.

In the above embodiments, the controller preferably includes a hysteresis in the switching between the common channel mode and the dedicated channel mode, depending upon variations in downlink quality, to avoid unnecessary switching on network overhead. In addition, the controller is operable to release a traffic plane radio resource for a group if the session activity for that group is idle beyond a predefined timer expiration value.

Figure 5:
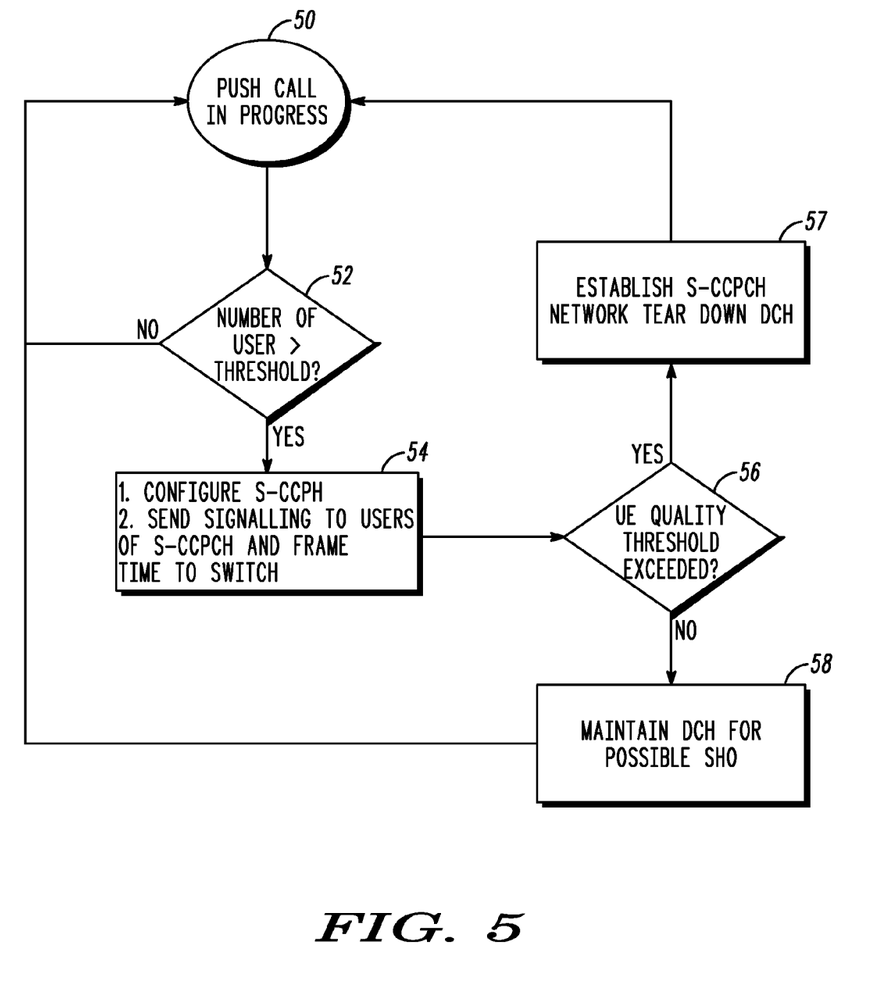
FIG. 5 shows a flow chart for a method in accordance with the present invention.

FIG. 5 is a logic flow diagram of steps executed by a wireless communication network in accordance with the present invention. The logic flow begins 50 when the communication infrastructure receives, from a requesting communication unit of a group on a Random Access Channel (RACH), a request for a group call or other PTx service with other communication units of the group. It is assumed that a group page identity for the plurality of communication units of the group has been established. The request for a group call specifies at least the call group for which the call is intended. Typically, the group call request can be originated by a communication unit that is a member of the targeted call group or by any communication device with access to the communication infrastructure, such as a telephone (not shown), wishing to establish communications with the call group.

In response to the group call request, the communication network determines 52 whether there are a sufficient number of communication units for the group call to enable broadcast mode. If there an insufficient number of UEs in the group, a group call is made under conventional dedicated channel means. However, if a sufficient number of UEs are available, the network provides a single group paging message using the group page identity on a paging channel (PCH) to the group of the plurality of communication units with information for group call set up. Preferably, the paging channel is a paging control channel (PCCH).

Proceeding 54, the network then places the communication units for the group in broadcast mode (CELL_FACH state). In addition, the network allocates a common downlink channel for the group call at each BTS that is providing communication service to at least one communication unit of the group. Preferably, the common downlink channel is Secondary Common Control Physical Channel (S-CCPCH). As a result, one broadcast channel is allocated at each BTS to provide the communication unit(s) of the group, in that BTS's coverage area, the group call. The network also allocates a dedicated uplink channel for the requesting communication unit by a base transceiver system that is providing communication service to the requesting communication unit.

The communication infrastructure notifies each communication unit of the group of the identity of the common channel allocated for the group call at that communication unit's BTS. Techniques for accomplishing this notification are well known in the art. For example, in a typical CDMA system, this would be accomplished by transmitting, via a paging channel within a given cell, information that identifies the code allocated for the voice channel. The communication infrastructure receives voice information for the group call from a communication unit of the group, i.e., the transmitting communication unit. The PTx information is then sent to the communication units of the group via the common channel allocated for the group call at each BTS.

A novel aspect of the method is a step of switching one of the communication units between a common channel mode and a dedicated channel mode depending upon performance criteria 56. The performance criteria is measured against the group communication and can include measures of time, signal quality, number of users, and traffic volume. Criteria thresholds are provided for the criteria. Flexibility can be provided by the network wherein the criteria thresholds are based upon quality of service for each bearer service.

In one embodiment, the performance criteria of the switching step is a number of communication units in the group, wherein if the number is greater than a predetermined number threshold then at least one of the plurality of communication units of the group are switched to a dedicated channel (CELL_DCH) state.

In another embodiment, the performance criteria of the switching step is a talk time on the common channel, wherein if the talk time is greater than a predetermined time threshold then that communication unit is switched to a dedicated channel (CELL_DCH) state.

In yet another embodiment, the performance criteria of the switching step is a transmission traffic volume for the group, wherein if the transmission traffic volume is greater than a predetermined transmission traffic volume threshold then at least one of the plurality of communication units of the group are switched to a dedicated channel (CELL_DCH) state.

In yet another embodiment, the performance criteria 56 of the switching step is a quality of signal on the common downlink channel to a communication unit in the group, wherein if the quality is less than a predetermined quality threshold then that communication unit is switched to a dedicated channel (CELL_DCH) state. The quality criteria is also useful in soft handoff, where it is assumed that a UE is near the edge of a cell where signal quality is poorest. In this case, the switching to a (CELL_DCH) state is predicated on that communication unit being in a soft handoff mode 58. Alternatively, the predetermined quality threshold 56 is selected such that the common channel broadcast will provide a lower quality than the threshold at a location of a communication unit within a cell edge of the serving base transceiver system.

In any of the above cases, the particular criteria is periodically tested against its threshold and if the threshold is exceeded then the group call can proceed, and dedicated resources are free to be used for other services 57. Also, it is preferred that the switching step includes a hysteresis in the switching between the common channel mode (CELL_FACH state) and the dedicated channel mode (CELL_DCH state) to reduce unnecessary switch backs which consume network resources.

In a preferred embodiment, a UE in soft handoff can benefit from macro diversity. For example, if the network determines that a communication unit is in soft handoff mode, the same common channel can be used by the base transceivers of adjacent cells for soft-combining of macro diversity branches for that communication unit.

In any of the above case, the network can release a traffic plane radio resource for a group if the session activity for that group is idle beyond a predefined timer expiration value, such as 120 seconds for example.

As a result of the above, network throughput gain is very high for a high number of users within quality regions.

EXAMPLE

A simulation was performed to compare the radio performance of the present invention among different PoC schemes. The techniques described above work well with the existing 3GPP standards (Rel. 6). Two schemes were simulated: 1) traditional PoC using only dedicated channels, and 2) the CELL_FACH solution with soft combining, in accordance with the present invention. Tables 1 and 2 provide the simulation parameters that were used. One of ordinary skill in the art should be able to duplicate the results using these parameters. Therefore a further discussion of the testing parameters should not be needed.

TABLE 1

System simulation parameters

| Parameter | Explanation/assumption | Comments |
|---|---|---|
| Cellular layout | Hexagonal grid, 3-sector sites | 57 sectors (3 rings) |
| Simulation type | Snapshot | 10,000 drops |
| Cell radius | 1000 meters | |
| Antenna Pattern | Gain = min | Front-to-back-ratio = 20 dB |
| | $(12(\Theta/\Theta 3 \text{ dB})^{\wedge}2, 20)$ | Half-power-beam-width = 70 degrees |
| Propagation Model | PL = 128.1 + 37.6 log10(d) | D in Km |
| Lognormal std. | 8 dB | |
| Correlation between sectors | 1 | |
| Site-to-site correlation | 0.5 | |
| Carrier frequency | 2 GHz | |
| BS antenna gain | 14 dB | |
| Noise | None | Assuming interference limited |
| BS total power | 17 Watts or 42.3 dBm | |
| Antenna Bore-sight pointing towards flat side of the cell. | | |

TABLE 1-continued

System simulation parameters

| Parameter | Explanation/assumption | Comments |
|---|---|---|
| Users dropped uniformly in the whole cell | | |

TABLE 2

Parameters used to compute the coverage are:

| Parameters | Value |
|---|---|
| Channel | Vehicular A |
| Voice Rate | 12.2 kbps |
| Voice Activity | 0.32 |
| Mobile Speed | 3 km/h |
| Channel Estimation | Ideal |
| Channel Coding & Modulation | Rate ⅓ Convolutional code QPSK |
| Receiver | Ideal Rake |
| Interleaver Frame Size | 20 ms |
| Power Control | Fast PC & Slow PC |
| Number of TTIs per Mobile Drop | 3000 |
| FER Requirement for Coverage | 1% |

Figure 6:
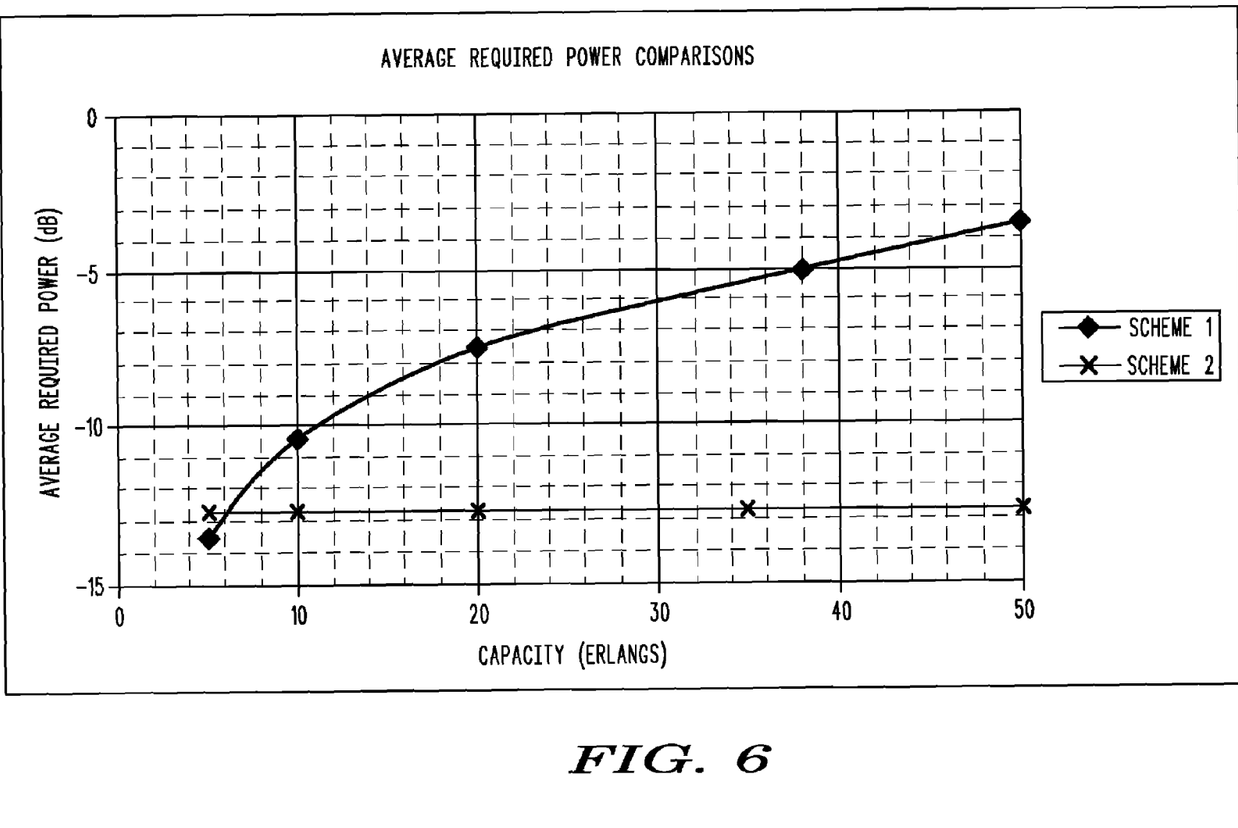
FIG. 6 shows a graph of the improvement provided in accordance with the present invention.

The results of the simulation are shown in graphical form in FIG. 6, which shows the average required downlink power for the two schemes. The control plane downlink overhead is considered. As can be seen, the present invention utilizes less base station power than the baseline PoC method, and therefore provide more efficient use of network resources in all higher capacity conditions, when it is needed most.

The present invention exhibits many novel aspects including: a) providing group services (not only MBMS) using broadcast channels, b) enabling of a broadcast mode depending on the number of UEs in CELL_DCH state and radio bearers, c) state transitions between CELL_DCH and CELL_FACH being based on uplink traffic volume and also based on downlink quality of broadcasting cells, d) any UEs receiving broadcast channels for group service at a cell edge boundary are switched to CELL_DCH state in soft handoff and cell re-selection, and e) a new talker in the group communication is first in CELL_FACH state, wherein a transmission timer is used for new talker to change to CELL_DCH state.

While the invention may be susceptible to various modifications and alternative forms, a specific embodiment has been shown by way of example in the drawings and has been described in detail herein. However, it should be understood that the invention is not intended to be limited to the particular forms disclosed, and can be applied equally well to any communication system that can use PTx services. Rather, the invention is to cover all modification, equivalents and alternatives falling within the scope of the invention as defined by the following appended claims.

What is claimed is:

1. A method for a wireless communication network to establish a wireless group call by at least one base transceiver system from one of a plurality of communication units to others of the plurality of communication units that are in the service coverage area of the at least one base transceiver system, the method comprising the steps of:
    establishing a group page identity for the plurality of communication units of the group;

determining whether there are a sufficient number of communication units for the group call to enable Forward Access Channel (FACH) broadcast mode whereupon the communication units for the group are placed in a CELL_FACH state;

providing a single group paging message using the group page identity on a paging channel (PCH) to the group of the plurality of communication units with information for group call set up;

receiving, from a requesting communication unit of a group on a Random Access Channel (RACH), a request for a group call with other communication units of the group;

allocating the Secondary Common Control Physical Channel (S-CCPCH) as a common downlink channel for the group call at each base transceiver system of the at least one base transceiver systems that is providing communication service to the others of the plurality of communication units of the group;

allocating a dedicated forward access channel (FACH) for the requesting communication unit by a base transceiver system that is providing communication service to the requesting communication unit; and switching one of the communication units between a common forward access channel (CELL_FACH) state and a dedicated channel (CELL_DCH) state depending upon performance criteria measured for the group call.

2. The method of claim 1, wherein the performance criteria of the switching step is a number of communication units in the group, wherein if the number is greater than a predetermined number threshold then at least one of the plurality of communication units of the group are switched to a dedicated channel (CELL_DCH) state.

3. The method of claim 1, wherein the performance criteria of the switching step is a talk time on the common downlink channel, wherein if the talk time is greater than a predetermined time threshold then that communication unit is switched to a dedicated channel (CELL_DCH) state.

4. The method of claim 1, wherein the performance criteria of the switching step is a transmission traffic volume for the group, wherein if the transmission traffic volume is greater than a predetermined transmission traffic volume threshold then at least one of the plurality of communication units of the group are switched to a dedicated channel (CELL_DCH) state.

5. The method of claim 1, wherein the performance criteria of the switching step is a quality of signal on the common downlink channel to a communication unit in the group, wherein if the quality is less than a predetermined quality threshold then that communication unit is switched to a dedicated channel (CELL_DCH) state.

6. The method of claim 5, wherein the switching to a (CELL_DCH) state is predicated on that communication unit being in a soft handoff mode.

7. The method of claim 5, wherein the predetermined quality threshold is selected such that the common channel broadcast will provide a lower quality than the threshold at a location of a communication unit within a cell edge of the serving base transceiver system.

8. The method of claim 1, wherein the switching step includes a hysteresis in the switching between the common channel state and the dedicated channel state.

9. The method of claim 1, wherein the allocating a common downlink channel step includes determining whether a communication unit is in soft handoff mode, wherein the same common downlink channel is used by the base transceivers of adjacent cells for soft-combining of macro diversity branches for that communication unit.

10. The method of claim 1, further comprising the step of releasing a traffic plane radio resource for a group if the session activity for that group is idle beyond a predefined timer expiration value.

11. The method of claim 1, wherein in the providing step the paging channel is a paging control channel (PCCH).

12. The network of claim 1, wherein the controller is operable to release a traffic plane radio resource for a group if the session activity for that group is idle beyond a predefined timer expiration value.

13. A wireless communication network to establish a wireless group call, the network comprising:

a plurality of communication units comprising a group;

at least one base transceiver system servicing the group, the at least one base transceiver system providing a group call from one of a plurality of communication units to others of the plurality of communication units that are in the service coverage area of the at least one base transceiver system; and a controller for controlling the at least one base transceiver system, wherein the controller is operable to: establish a group page identity for the plurality of communication units of the group; determine whether there are a sufficient number of communication units for the group call to enable Forward Access Channel (FACH) broadcast mode whereupon the communication units for the group are placed in a CELL_FACH state; provide a single group paging message using the group page identity on a paging channel (PCH) to the group of the plurality of communication units with information for group call set up; receive, from a requesting communication unit of a group on a Random Access Channel (RACH), a request for a group call with other communication units of the group, allocate the Secondary Common Control Physical Channel (S-CCPCH) as a common downlink channel for the group call at each base transceiver system of the at least one base transceiver systems that provides communication service to the others of the plurality of communication units of the group, allocate a dedicated forward access channel (FACH) for the requesting communication unit by a base transceiver system that provides communication service to the requesting communication unit, and switch one of the communication units between a common forward access channel (CELL_FACH) state and a dedicated channel (CELL_DCH) state depending upon performance criteria measured for the group call.

14. The network of claim 13, wherein the performance criteria is a number of communication units in the group, wherein if the number is greater than a predetermined number threshold then at least one of the plurality of communication units of the group are switched to a dedicated channel (CELL_DCH) state.

15. The network of claim 13, wherein the performance criteria is a talk time on the common downlink channel, wherein if the talk time is greater than a predetermined time threshold then that communication unit is switched to a dedicated channel (CELL_DCH) state.

16. The network of claim 13, wherein the performance criteria is a transmission traffic volume for the group, wherein if the transmission traffic volume is greater than a predetermined transmission traffic volume threshold then at least one of the plurality of communication units of the group are switched to a dedicated channel (CELL_DCH) state.

17. The network of claim 13, wherein the performance criteria is a quality of signal on the common downlink channel to a communication unit in the group, wherein if the quality is less than a predetermined quality threshold then that communication unit is switched to a dedicated channel (CELL_DCH) state.

18. The network of claim 17, wherein the switch to a CELL_DCH state is predicated on that communication unit being in a soft handoff mode.

19. The network of claim 17, wherein the predetermined quality threshold is selected such that the common channel broadcast will provide a lower quality than the threshold at a location of a communication unit within a cell edge of the serving base transceiver system.

20. The network of claim 13, wherein the controller includes a hysteresis in the switching between the common channel state and the dedicated channel state.

21. The network of claim 13, wherein the controller is operable to determine whether a communication unit is in soft handoff mode, wherein the controller directs that the same common downlink channel is used by the base transceivers of adjacent cells for soft-combining of macro diversity branches for that communication unit.

22. The network of claim 13, wherein the paging channel is a paging control channel (PCCH).

* * * * *